C. E. CAMPBELL.
TIME SWITCH.
APPLICATION FILED AUG. 10, 1915.

1,177,229.

Patented Mar. 28, 1916.
3 SHEETS—SHEET 1.

Witnesses.
R. W. Edwards.
D. R. Edwards.

Inventor:
Charles E. Campbell.
By Louis M. Lehmith
Atty.

C. E. CAMPBELL.
TIME SWITCH.
APPLICATION FILED AUG. 10, 1915.
1,177,229.
Patented Mar. 28, 1916.
3 SHEETS—SHEET 2.
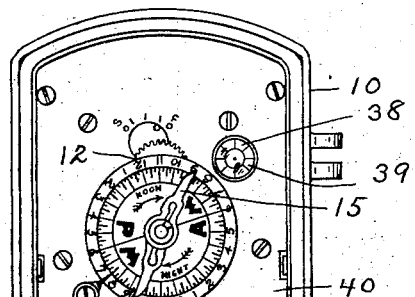
Fig. 7
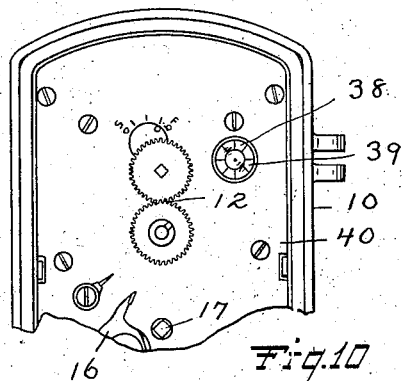
Fig. 8
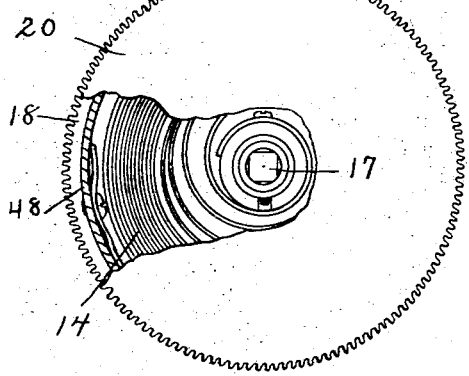
Fig. 9
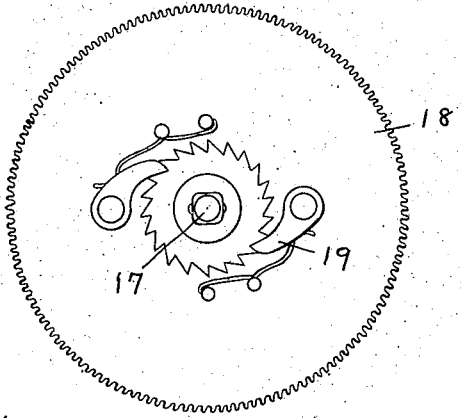
Fig. 10
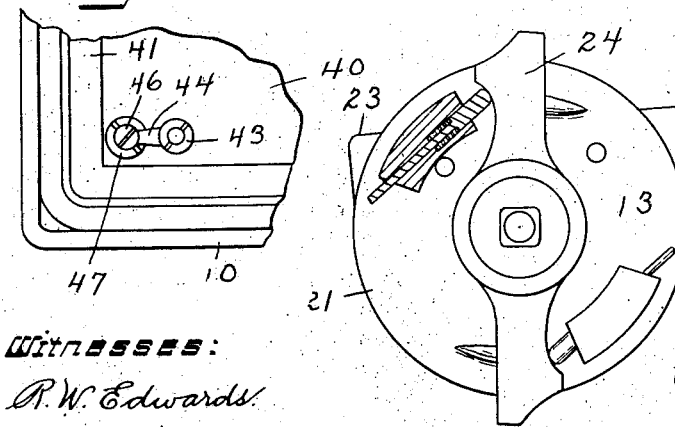
Fig. 16    Fig. 11    Fig. 12
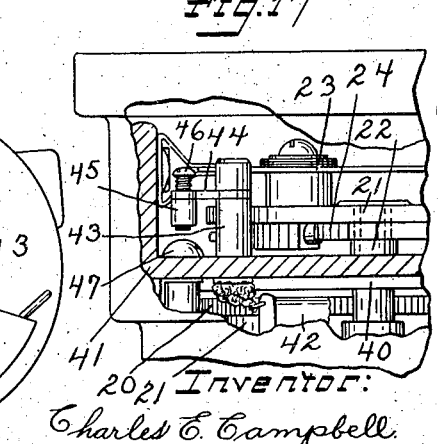
Witnesses:
R. W. Edwards
D. R. Edwards
Inventor:
Charles E. Campbell
By Louis M. Schmidt
Atty.

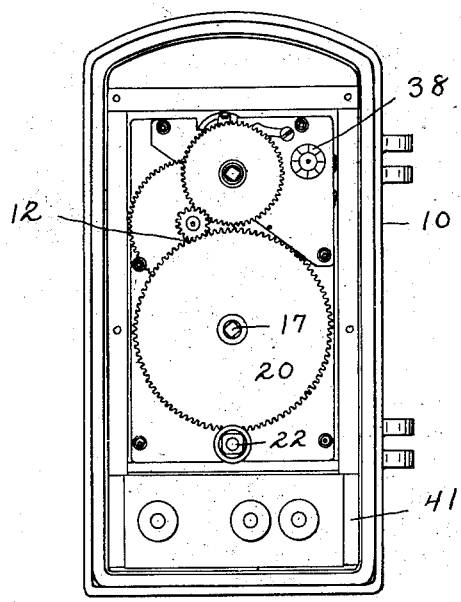
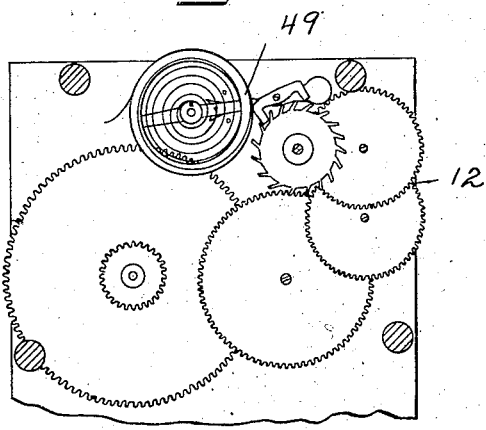
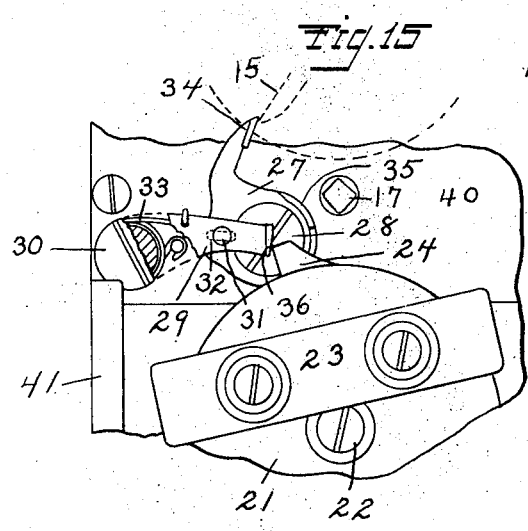
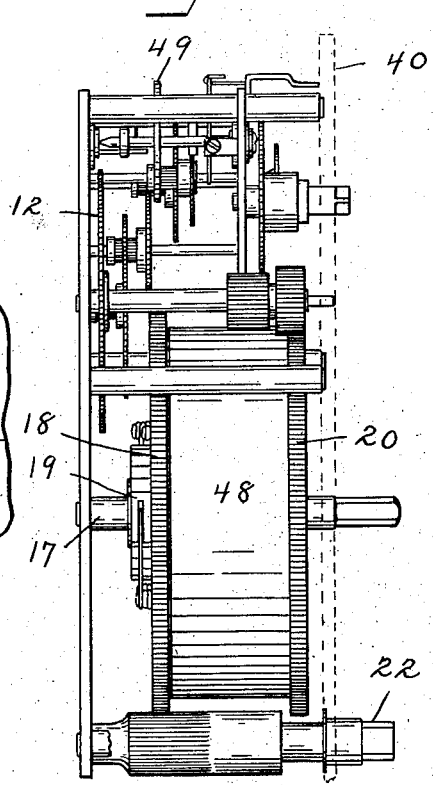

UNITED STATES PATENT OFFICE.

CHARLES E. CAMPBELL, OF LYNN, MASSACHUSETTS.

TIME-SWITCH.

1,177,229.　　　　Specification of Letters Patent.　　Patented Mar. 28, 1916.

Application filed August 10, 1915. Serial No. 44,793.

*To all whom it may concern:*

Be it known that I, CHARLES E. CAMPBELL, a citizen of the United States, residing at Lynn, in the county of Essex and State of Massachusetts, have invented certain new and useful Improvements in Time-Switches, of which the following is a specification.

My invention relates to improvements in time-switches, and the object of my improvement is simplicity and economy in construction and convenience and efficiency in use.

Figure 1:
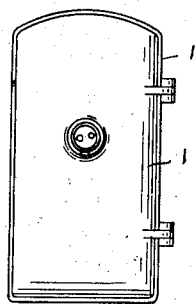
Figure 2:
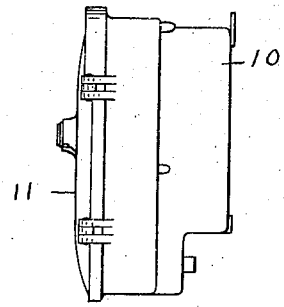
Figure 3:
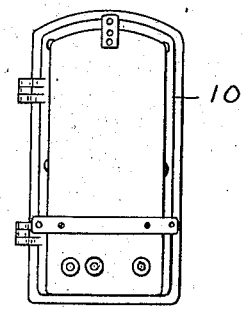
Figure 4:
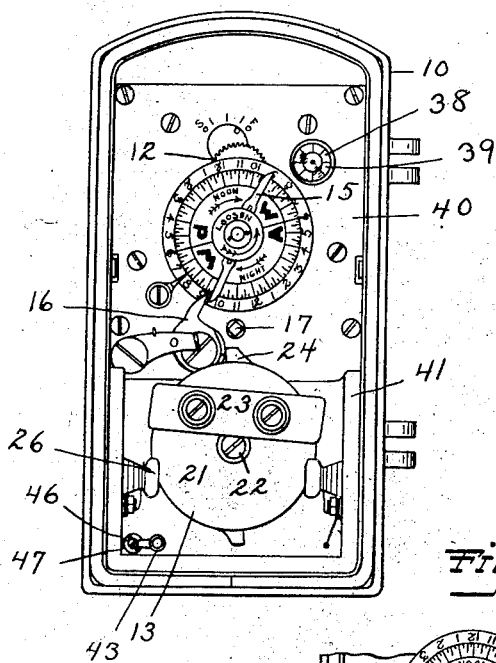
Figure 5:
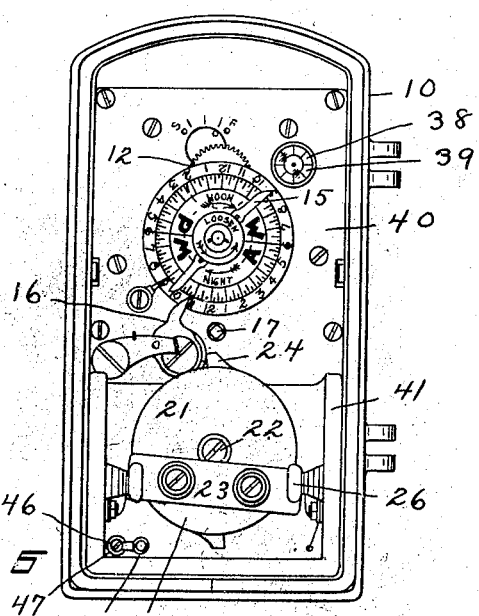
Figure 6:
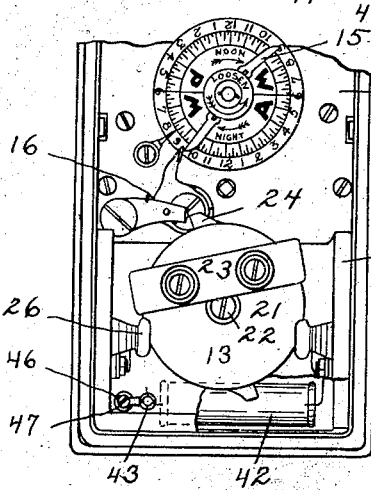

In the accompanying drawing Figure 1 is a front elevation of my improved time-switch. Fig. 2 is a side elevation of the same. Fig. 3 is a rear elevation of the same. Fig. 4 is a front elevation, on an enlarged scale, of the same with the cover removed. Figs. 5 and 6 are similar views of the same with the parts in different positions. Fig. 7 is a front elevation of the upper part of the same with the clamping nut for the tripping hands removed. Fig. 8 is a front elevation, with the dial plate removed. Fig. 9 is a front elevation of the spring member. Fig. 10 is a rear elevation of the same. Fig. 11 is a rear elevation of the switch blade carrier. Fig. 12 is a front elevation, on the same scale as Fig. 4, with the front part removed. Fig. 13 is a side elevation, on an enlarged scale, of the clock mechanism. Fig. 14 is a front elevation of the clock escapement and adjacent parts. Fig. 15 is a front elevation, on a still further enlarged scale, of the switch escapement. Fig. 16 (Sheet 2) is a front elevation of the heating coil contact and adjacent parts. Fig. 17 is a bottom view of the same.

My improved time-switch is housed in a casing 10 provided with a cover 11, and comprises clock mechanism 12 and switch mechanism 13 operated by a spring 14 and suitable tripping mechanism comprising hands 15 operated by the clock mechanism and a switch escapement 16. The spring 14 is housed in a unitary structure comprising a shaft 17 to which the inner end of the spring 14 is connected, the rear gear 18 connected to the said shaft 17 by means of the ratchet and gear 19, and the front gear 20, loosely mounted on the shaft 17, and connected to the outer end of the spring 14 through the medium of the cylindrical shell 48, which incloses the spring and is rigidly connected to the said front gear 20. The front gear 20 operates the clock mechanism 12 through the medium of suitable gearing, and the rear gear 18 through the medium of suitable gearing actuates the switch mechanism 13 comprising the rotating switch blade supporting disk 21, mounted on the shaft 22.

The disk 21 carries the switch blade 23 that extends in the line of a chord, to one side of the shaft 22, suitably to cross-connect the contacts 26 when positioned generally below the said shaft, as shown in Fig. 6, and to be out of contact with the same when on the upper side of the said shaft, as shown in Figs. 4 and 5.

The disk 21 carries a diametral arm 24 whose ends serve alternately as stop lugs to limit the rotative movement of the disk 21, and thereby hold the switch in the open or closed position as the case may be, responsive to operation of the tripping arms or hands 15 in effecting the tripping of the switch escapement 16. The said switch escapement 16 comprises a plate 27 rotatively mounted on a pivotal screw 28, and an arm 29 pivotally mounted on a screw 30 and connected to the plate 27 by means of a pin 31 on the arm 29 operating in a slot 32 in the said plate 27, and a coil spring 33 connected to the arm 29 and tending to elevate the same, and to position the escapement members 27 and 29 in opposition to the movement effected by the tripping hands 15.

The plate 27 carries a laterally, and generally upwardly directed finger 34 that is normally in the path of the tripping hands 15 and a detent 35 that is normally engaged with one of the ends of the arm 24 and prevents the rotation movement thereof. Fig. 4 shows the position normally maintained for these parts by the coil spring 33. In this position, the detent 36 carried by the end of the arm 29 is above and out of the line of movement of the stop arm 24.

As the finger 34 is moved by the tripping hand 15 the detent 35 is raised and the detent 36 is lowered until the detent 35 is raised above the holding position with the arm 24, when the disk 21 is turned slightly until the arm 24 engages with the detent 36, as the finger 34 continues to be moved by the tripping hand 15, the point is finally reached for operating the switch, when the tripping hand 15 has passed beyond the reach of the finger 34. In this position the spring 33 is free to bring the escapement mechanism to the normal position, and this is effected, with the result that the second detent 37 is cleared of the stop arm 24, permitting the disk 21 to turn, and the first detent 35 is brought into line with the next stop 24.

The small dial 38 is operated by the clock mechanism 12 at a relatively high rate of speed and is exposed through a glass window 39 in the front plate 40, so that whether or not the clock mechanism 12 is operating can be determined by direct observation.

A porcelain lining 41 incloses the disk 21 at the rear and sides, and on the rear side thereof is mounted a heating coil 42. A terminal stud 43 extends through the lining 41, is connected at the rear side with one end of the heating coil 42 and on the front supports a laterally directed plate 44, which in turn supports a threaded sleeve 45. A screw 46 is engaged with the threaded sleeve 45, having the head exposed at the front.

In line with the screw 46 is a terminal stud 47 which is connected with the line. Therefore, by moving the screw 46 inwardly and outwardly to make and break contact with the stud 47 the heating coil 42 may be connected with and disconnected from the line. The heating coil 42 is connected in cold weather, when the time switch is installed for out-door use.

It will be noted that the main spring 14 has the ends connected to two separate gears, respectively the front gear 20, and the rear gear 18, which gears operate as separate driving gears for distinct mechanisms, comprising the clock mechanism, which is designated as a whole by the character 12, which is driven by the front gear 20, and the switch mechanism, which is designated as a whole by the character 13, and which is driven by the rear gear 18.

The clock mechanism 12 is regulated by the clock escapement 49 Fig. 14 in the usual manner. Furthermore the clock mechanism 12 and the switch mechanism are interconnected by the switch escapement 16 in the special manner described. Thus the switch escapement 16 serves as a back stop, both to hold the main spring 14 in restraint and to hold the switch mechanism in the position described, and changes in the said switch mechanism are made responsive to movements of the tripping hands, which are controlled in their operation by the clock mechanism.

The complete operation of the switch mechanism involves an initial partial movement of the switch blade carrying disk 21 and a final movement, completing a 180 degree turn, by reason of the coöperation of the two detent carrying members, 27 and 29. Such 180 degree turn is permitted the switch blade carrying disk 21 by reason of the offset position of the switch blade 23, relative to the axis of revolution. This arrangement permits the detents to check the disk so that the same will alternatively hold the switch blade 23 below the axis and above the axis, in one of which positions the switch blade 23 serves to cross-connect the stationary contacts, and in the other serves to interrupt such connection.

I claim as my invention:

1. A time switch comprising clock mechanism having a dial and a tripping hand, a main spring connected by one end to the said clock mechanism, switch mechanism connected to the other end of the said main spring, and comprising a rotating member having a radially positioned stop, and detent mechanism controlled by the clock and in turn controlling the release of the switch mechanism, the said detent mechanism comprising a pair of pivotally mounted detent members, one of the said detent members having a detent for normally engaging with the said stop and disengaging therefrom when turned away from such normal position and having a radial finger for engaging with the said tripping hand, the other of the said detent members having a detent for engaging with the said stop when the said first detent member is turned from its normal position, and releases the said stop.

2. In time-switch mechanism, in combination, clock mechanism comprising a dial and a tripping hand, switch mechanism comprising a rotating member having a stop arm, a main spring operatively interconnecting the said mechanism, having one end connected to the said clock mechanism and the other end connected to the said switch mechanism, and an escapement device serving as interconnecting means, controlled by the said clock mechanism and in turn controlling the said switch mechanism comprising a pair of detent plates, pivotally mounted, the first of the said plates having a finger for engaging with the said tripping hand, and having a detent that initially engages with the said stop arm and which is freed from such engagement by a partial movement of the said first plate, and the other of the said detent plates being connected to the said first plate, having a detent that is swung into the path of the said stop as the said first detent plate is turned from its normal position suitably to receive the said stop arm as the latter is freed from the said first detent.

CHARLES E. CAMPBELL.

Witnesses:
A. M. RICH,
J. SCHWARTZ.